May 11, 1954

E. L. LUND 2,678,150

CARRIER ATTACHMENT OR SUPPORT FOR TRUCKS OR OTHER VEHICLES

Filed July 27, 1951

INVENTOR
EVERETT L. LUND

BY *Young & Wright*

ATTORNEYS

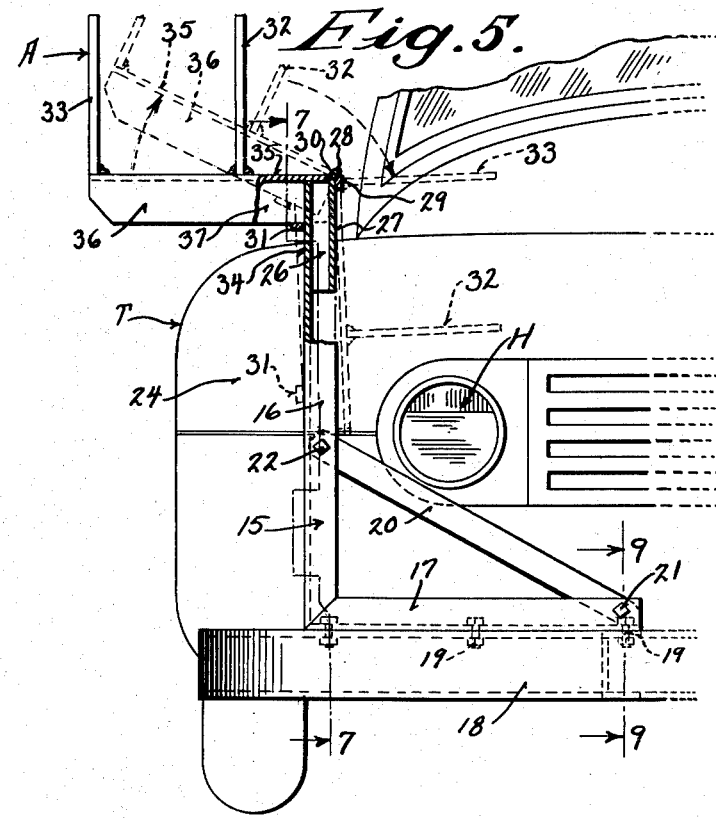
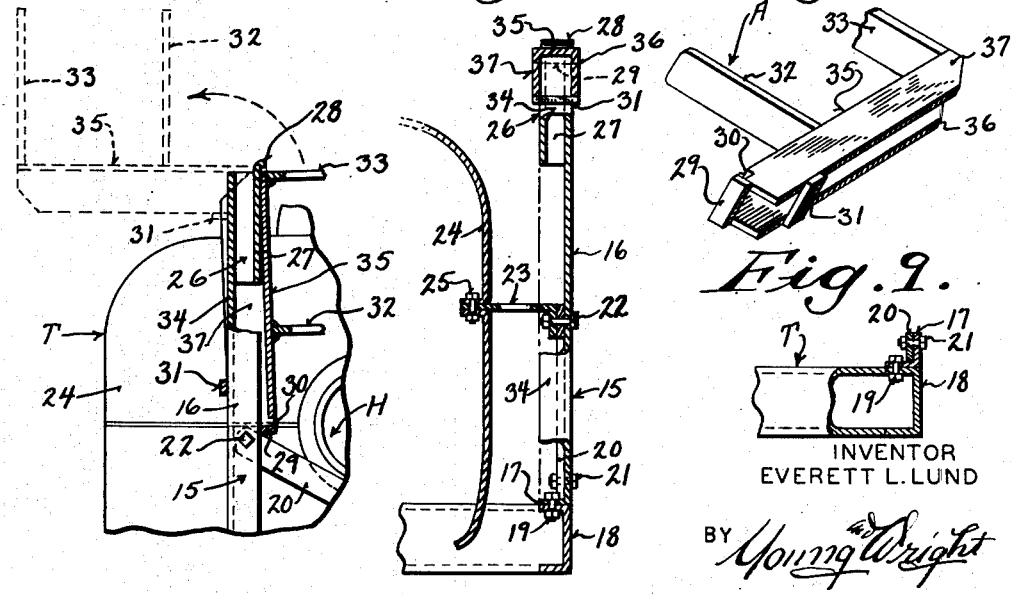

Patented May 11, 1954

2,678,150

UNITED STATES PATENT OFFICE 2,678,150

CARRIER ATTACHMENT OR SUPPORT FOR TRUCKS OR OTHER VEHICLES

Everett L. Lund, Milwaukee, Wis.

Application July 27, 1951, Serial No. 238,795

2 Claims. (Cl. 224—42.45)

This invention appertains to carrier attachments or supports on trucks or other vehicles for carrying round bars or tubular material and other elongated articles on the side thereof, and more particularly to supports of the above type which may be readily and quickly moved from a work supporting position to an out of the way work rest position.

A primary object of my invention is to provide a device of the above character which is so constructed that it may be readily attached to the outer portion of the vehicle body, and which when so attached will maintain in position elongated articles for transportation.

Another object of my invention is to provide carrier attachments or supports on trucks so constructed that the elongated articles may be removed transversely therefrom, thereby permitting the use of the carrier when the truck is placed in close quarters where longitudinal withdrawal of the supporting elements is rendered difficult.

A salient feature of my invention resides in the fact that the carriers or supports are very easily attached and as easily detached when not needed, and in addition may be readily moved from a work carrying position to a work rest position.

A more specific object of my invention is to provide front and rear U-shaped carriers for supporting elongated articles on the side of a truck, the rear carrier adapted to be removably received in a stake socket of the truck, and the front carrier having two positions on its holder, which holder is in turn secured to the extreme forward end of the truck.

A still further object of my invention is to provide a simple practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

One preferred and practical embodiment of my invention is shown in the accompanying drawings in which:

Figure 5 is a fragmentary front elevational view of the truck showing my front carrier mounted thereon, certain parts of the carrier and its support being broken away to show details in their construction, and illustrating in full lines the front carrier in its work carrying position;

Figure 6 is a fragmentary front elevational view similar to Figure 5 but showing in full lines my front carrier in its work rest position, and in dotted lines the work carrying position;

Figure 7 is a side elevational view in section, the section being taken on the line 7—7 of Figure 5, looking in the direction of the arrows;

Figure 8 is an isometric perspective of my front carrier further illustrating details of its construction; and Figure 9 is a section through the vehicle bumper and supporting elements for my front carrier, the section being taken on the line 9—9 of Figure 5 and looking in the direction of the arrows.

Referring to the drawings in detail wherein similar reference characters designate corresponding parts throughout the several views, the letter T generally indicates a truck having mounted thereon a front carrier A and a rear carrier B constructed in accordance with my present invention.

Figure 1:
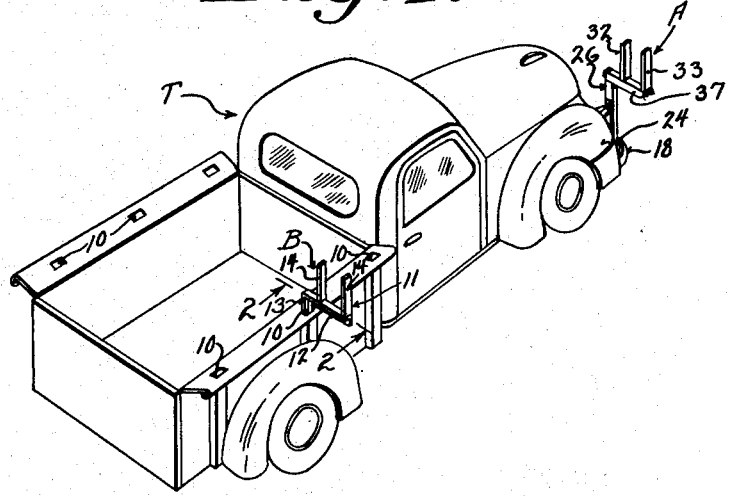
Figure 1 is an isometric perspective showing my novel carrier attachments secured to a truck and in the work supporting position.
Figure 2:
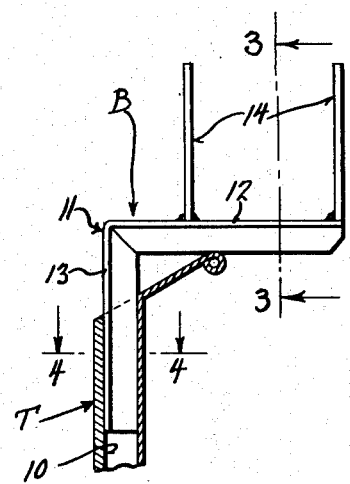
Figure 2 is a rear elevational view of my rear carrier, a fragmentary section being taken through the truck body on the line 2—2 of Figure 1, and looking in the direction of the arrows.
Figure 3:
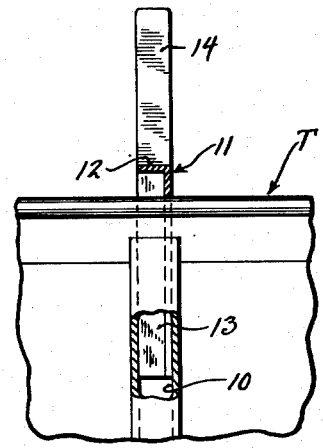
Figure 3 is a side elevational view in section through my rear carrier, the section being taken on the line 3—3, and looking in the direction of the arrows.
Figure 4:
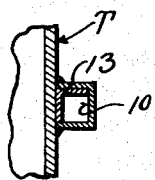
Figure 4 is a section taken on the line 4—4 of Figure 2 and looking in the direction of the arrows.

As clearly shown in Figure 1, the rear carrier B is adapted to be received in any one of the stake sockets 10, and by referring in particular to Figures 2, 3 and 4, it can be seen that the rear carrier B is preferably formed from a continuous length of angle iron 11 which has been V-notched in the usual method and bent at a right angle to form a work supporting surface 12 and a depending right angularly extending leg 13 which is received in the stake socket 10 of the truck body. It is obvious that rear carrier B may be formed either tubular or channel in shape and made of any desired material which is strong enough to withstand the stress and strain required. The upper work supporting surface 12 is provided with upstanding legs which form with the surface 12 a U-shaped support for receiving one end of the elongated article to be supported therein.

As shown in particular in Figures 6 and 7, the front carrier A is firmly supported in a position forward of the truck T by means of a supporting holder 15. Holder 15 is also preferably formed of angle iron and includes an upright standard 16 and a right angularly extending supporting leg 17. The supporting leg 17 is rigidly bolted to the bumper 18 of the truck by means of bolts 19 as shown. In order to give strength and rigidity to the upright standard 16, I provide a crossbar 20 which is securely bolted at 21 to the leg 17, and at 22 to the upright standard 16. If necessary, I also provide a short brace bar 23 which may be fastened by bolt 22 to the standard 16, and which is securely braced at one end to the fender 24 of the truck. In some types of trucks, particularly the Ford type, the fender 24 is formed of two pieces, and in this type of truck I firmly secure the short brace 23 between the two main fender sections by means of the bolt 25.

While the main portion of the supporting holder 15 is formed from channel iron, the upper end of the upright standard 16 is provided with a short tubular section 26. The inner surface 27 of the tubular section 26 is extended slightly above its upper end, and terminates in a hook or lip 28, the purpose of which will be more readily apparent as the description proceeds.

Referring to Figure 8, it will be observed that the front carrier A is somewhat similar to rear carrier B, having upstanding legs 32 and 33 forming the U-shaped work support. However, the front carrier A is made from a straight piece of channel iron and has a work supporting surface 35, depending sides 36 and 37 and, as shown, the sides 36, 37 terminate at one end beyond the work supporting surface 35. Across the outer extreme of this end a short bar 29 is firmly secured. The upper surface of bar 29 lies flush with the work supporting surface 35, and the bar 29 forms with the adjacent end of the upper surface 35 a slot or opening 30, shown perhaps more clearly in Figure 6 of the drawing.

Transversely across the bottom surface of the depending sides 36, 37, I provide a similarly shaped bar 31, and it is to be noted that the distance between the inner surface of the bar 31 and the extreme ends of the sides 36, 37 where bar 29 is secured is substantially the same as the width of the tubular portion 26 of the upright standard 16. Thus the space between the two bars 29, 31 comprise a pocket for receiving the tubular section 26, and opening 30 receives the hook or lip 28 when the carrier A is in its work holding position.

When it is desired to carry a load of pipes or other elongated articles on the truck, the leg 13 of the rear carrier B is placed in any one of the stake sockets 10 according to the length of the articles to be supported, and the work-supporting surface 12 extends outwardly from the truck body. The front carrier A is thus placed in a position where it is firmly held on the upright standard 16 with the crossbar 29 engaging under the hook 28, and the crossbar 31 resting against the surface 34 of the tubular portion 26, as clearly shown in the full line position of Figure 5.

If it is desired to move the carriers from their work supporting position to their work rest position, the rear carrier B is simply pulled out of its stake socket 10 and either laid in the hole of the truck or reversed and placed back into the socket with the work supporting surface extending inside of the truck body. The front carrier A (Figure 5) is simply pushed upwardly as indicated by the dotted arrows and dotted lines and allowed to slide down and telescope over the tubular portion 26 of the upright standard 16 until the bar 29 rests against the cross piece 20. This position is illustrated by the full lines in Figure 6 of the drawing, and it is to be particularly noted that the movement of my front carrier A has been so designed that the carrier does not interfere in any way with the headlight H of the vehicle.

When it is again desired to return the carrier A to its work supporting position, it is merely necessary to move the carrier from its full line position (Figure 6) in the direction of the dotted arrow to its dotted line position. This is accomplished by moving the carrier slightly inwardly to clear the lip or hook 28, and then pushing it upwardly and allowing the carrier by its own weight to move outwardly as shown.

From the above description, it can be seen that I have provided a novel carrier attachment or support for vehicles which may be readily placed in its work supporting position, and just as easily moved to an out of the way work rest position, and if desired may be actually detached from the vehicle.

From the foregoing, it is believed that the features and advantages of the invention will be readily apparent to those skilled in the art, and it will, of course, be understood that changes in the form, proportion and minor details of construction may be resorted to without departing from the spirit of the invention or the scope of the appended claims.

I claim:

1. A carrier attachment for automotive vehicles having a work supporting position and a work rest position and adapted in its work supporting position to receive and support elongated articles near one end comprising an article carrier, said article carrier having a straight channel shaped body forming an upper work supporting surface and depending side members, said side members terminating at a point beyond said upper work supporting surface, an upright standard rigidly secured to the forward end of said vehicle and means including transversely spaced bars on said carrier cooperating with the upright standard for alternately holding said carrier in its work supporting position and in its work rest position.

2. A carrier attachment for automotive vehicles having a work supporting position and a work rest position and adapted in its work supporting position to receive and support elongated articles near one end comprising an upright standard secured to the forward position of said vehicle, the upper end of said standard being formed as a tubular body and having an upwardly extending lip formed on the inner surface of the tubular body, a U-shaped carrier being channel shaped in cross section to form an upper work supporting surface and depending side members, said side members terminating at one end beyond the work supporting surface, and a pair of transversely positioned bars on the said end of the U-shaped carrier forming a pocket for receiving the tubular body of said upright standard, whereby the carrier may be held at right angles to the upright standard in its work supporting position or telescoped over the upright standard in its work rest position.

References Cited in the file of this patent

UNITED STATES PATENTS

| Number | Name | Date |
|---|---|---|
| 1,497,564 | Howells | June 10, 1924 |
| 1,562,808 | Thompson, Jr. | Nov. 24, 1925 |
| 2,143,900 | Rarey | Jan. 17, 1939 |
| 2,233,273 | Di Vincenzo | Feb. 25, 1941 |
| 2,570,802 | Hatteberg | Oct. 9, 1951 |